Figure 1:
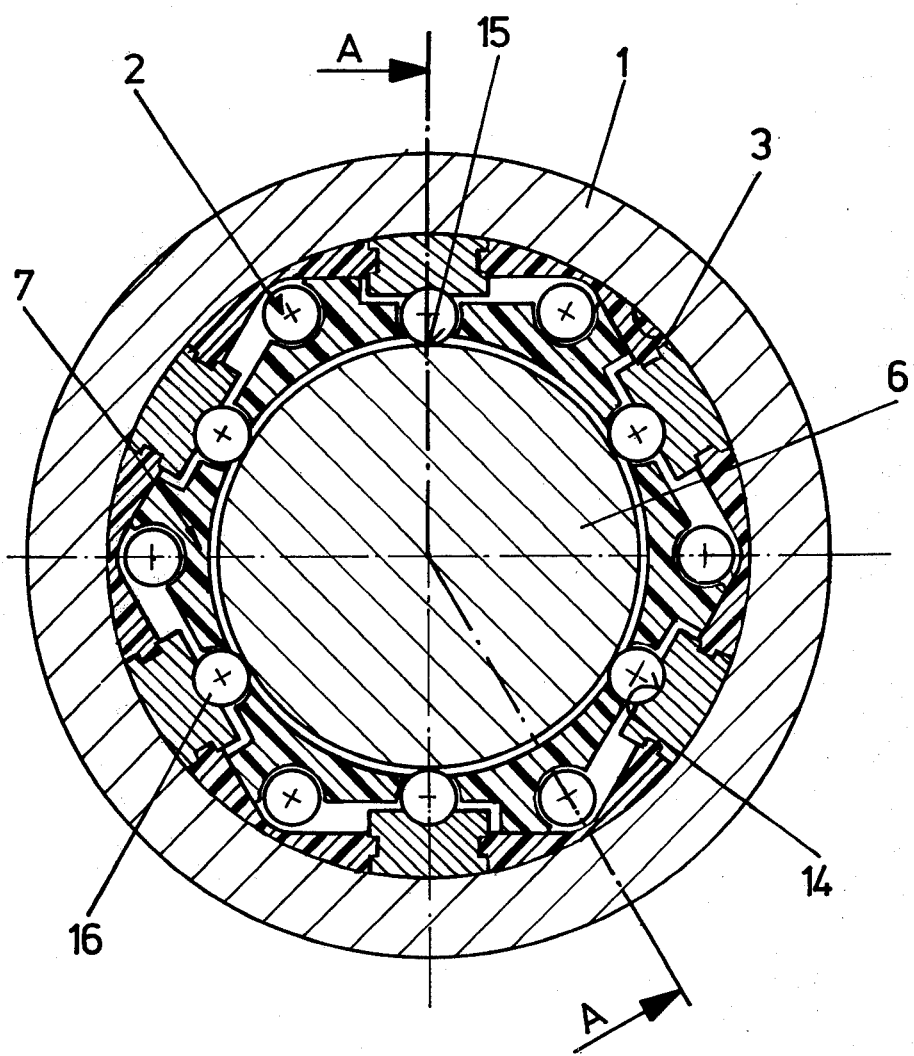

United States Patent [19]

Walter et al.

[11] 4,443,042
[45] Apr. 17, 1984

[54] ROLLING BEARING FOR LENGTHWISE MOVEMENT

[75] Inventors: Lothar Walter, Schweinfurt; Walter Reith, Bad Bocklet, both of Fed. Rep. of Germany

[73] Assignee: SKF Kugellagerfabriken GmbH, Schweinfurt, Fed. Rep. of Germany

[21] Appl. No.: 429,294

[22] Filed: Sep. 30, 1982

[30] Foreign Application Priority Data

Nov. 21, 1981 [DE] Fed. Rep. of Germany ....... 3146252

[51] Int. Cl.³ .............................................. F16C 31/06
[52] U.S. Cl. .................................... 308/6 C; 308/6 R
[58] Field of Search .............. 308/6 C, 6 R, 3 R, 3 A, 308/3 B, 6 A, 235

[56] References Cited

U.S. PATENT DOCUMENTS

| 3,545,826 | 12/1970 | Magee et al. | 308/6 C |
| 3,893,732 | 7/1975 | McCloskey | 308/6 C |
| 4,025,995 | 5/1977 | Thomson | 308/6 C |
| 4,120,538 | 10/1978 | Headen | 308/6 C |
| 4,128,278 | 12/1978 | Headen et al. | 308/6 C |
| 4,138,167 | 2/1979 | Ernst et al. | 308/6 C |

Primary Examiner—Stuart S. Levy
Assistant Examiner—Thomas R. Hannon
Attorney, Agent, or Firm—Daniel M. Rosen

[57] ABSTRACT

A rolling bearing for lengthwise movement on a shaft (6) has a cage assembled in the bore of a housing surrounding the shaft. The cage has at least one longitudinally extending guide slot extending radially therethrough and a rail supported in the bore of the housing and outwardly covering the guide slot. The rolling bodies, which are inserted in the guide slot of the cage, are arranged to run serially in rows between the longitudinally directed races of the rail and shaft.

In order that the rolling body for lengthwise movement can withstand the greatest load forces in the angular deviation and bending of the shaft, the rail consists of at least two partial rails individually tiltably supported in the bore of the housing and arranged adjacent one another in the lengthwise direction.

9 Claims, 7 Drawing Figures

B-B

ROLLING BEARING FOR LENGTHWISE MOVEMENT

The above invention relates to a rolling body for a lengthwise movement.

A rolling body for lengthwise movement of the above type is known, which has an annular cage, in which an individual longitudinally extending rigid rail is assembled in the longitudinally running guide slots (DE-PS No. 1575608) in each cage. In order to give the rolling bearing an insensitivity to angular deviation and bending of the shaft, this rolling bearing has a rail set in the guide slots, which has an outer surface sloping down to its lateral end. The outer surface supports itself in the bore of the housing and can tip somewhat in the longitudinal direction and automatically adjust itself according to bending or sagging of the shaft. The shaft sometimes does not attain this adjustability to the rail upon larger sagging of the shaft with corresponding greater curvature of the bending line, since the rails of the rolling bodies always remain rectilinearly aligned under the stiff rails. The races of the rails of the known rolling bearings can also not adapt to the curvature of the races of the bent shaft. A result therefore is that in long rails above all a destructive seizing of the rolling bearings between the races of the rail and the shaft can occur. This is especially the case if the longitudinally directed races of the rail and shaft are formed to be groove shaped, since then upon sagging of the shaft the rolling bodies of the rolling bearing can become seized both in the radial direction as well as also against the side walls of the groove shaped races, hence in the circumferential direction of the rolling bearing. As a consequence an overloading of the individual rolling bodies under the respective rail of the rolling bearing begins under some conditions and the rolling bearing has a too short useful life in such conditions.

The invention is based upon the problem of providing a rolling bearing for lengthwise movement of the above type, which can withstand the highest loading upon the bending and sagging of the shaft.

With the arrangement in accordance with the invention it is achieved that the outwardly covered relatively partial rails of the respective guide slots can perform a mutual tilting movement corresponding to the bending line of the shaft. The partial rails automatically adjust according to the curvature of the race of the shaft. The rolling bodies roll on the straight races of the relatively stiff partial rails, so that the individual races of the partial rails in each case automatically adjust to be tangent to the bending line of the shaft. The length of the race of the individual partial rails can be made sufficiently short corresponding to the degree of the curvature of the shaft occurring in operation, in that the rails may be separated into two or more partial rails. As a result a seizing of the rolling bodies between the races of the rail and shaft is avoided for any loading.

Advantageous additional constructions of the invention are also disclosed.

The preferred embodiment of the present invention has the advantage that each rail is supported to be stiff in the radial direction and unyielding in the bore of the housing. Also there is no injurious radial displacement of the shaft upon higher loading of the rolling bearing, so that the shaft is always precisely guided in the rolling bearing.

This embodiment also provides a simple construction for the rolling bearing.

A further embodiment of the present invention enables the rail to be laterally slid onto the outer surface of the cage. In this manner the assembly of the rolling bearing is simplified.

Both embodiments provide the result that the rolling bodies arranged in rows in the respective guide slot collectively take on the force transmission. The corresponding rolling bearing thus has a relatively high carrying capacity in a longitudinally short structural length.

A further embodiment provides the advantage that it exhibits low friction on the facing surface of the partial rails that slide on one another upon the mutual tipping of two adjacent partial rails in the radial direction and thereby has minimum contact wear.

Another arrangement according to the present invention enables the adjacent partial rails to roll on one another on their circumferentially directed convex curved facing surfaces, when they are tilted mutually in the circumferential direction corresponding to the bending line of the shaft.

A further embodiment according to the present invention provides an elastically yielding support of the two opposed contacting facing surfaces of the partial rails which permits a mutual displacement of these facing surfaces at least in part due to the elastic deformation of the elastic material (without abrasion-dependent sliding of the two facing surfaces on one another). This elastic material can be affixed to the facing surfaces of the rail pieces by glue or the like, so that the adjacent partial rails are connected elastically with one another to an integral rail.

Finally, another arrangement provides a rolling bearing for lengthwise movement in which the two or more partial rails are held at a small distance from one another at their mutually facing surfaces, so that they adjust without hindrance and without mutual contact and can adapt to the bending line of the shaft.

The rolling bearing for lengthwise movement in accordance with the invention will be more clearly disclosed in the following description of several embodiments, which are illustrated in the drawings.

Figure 2:
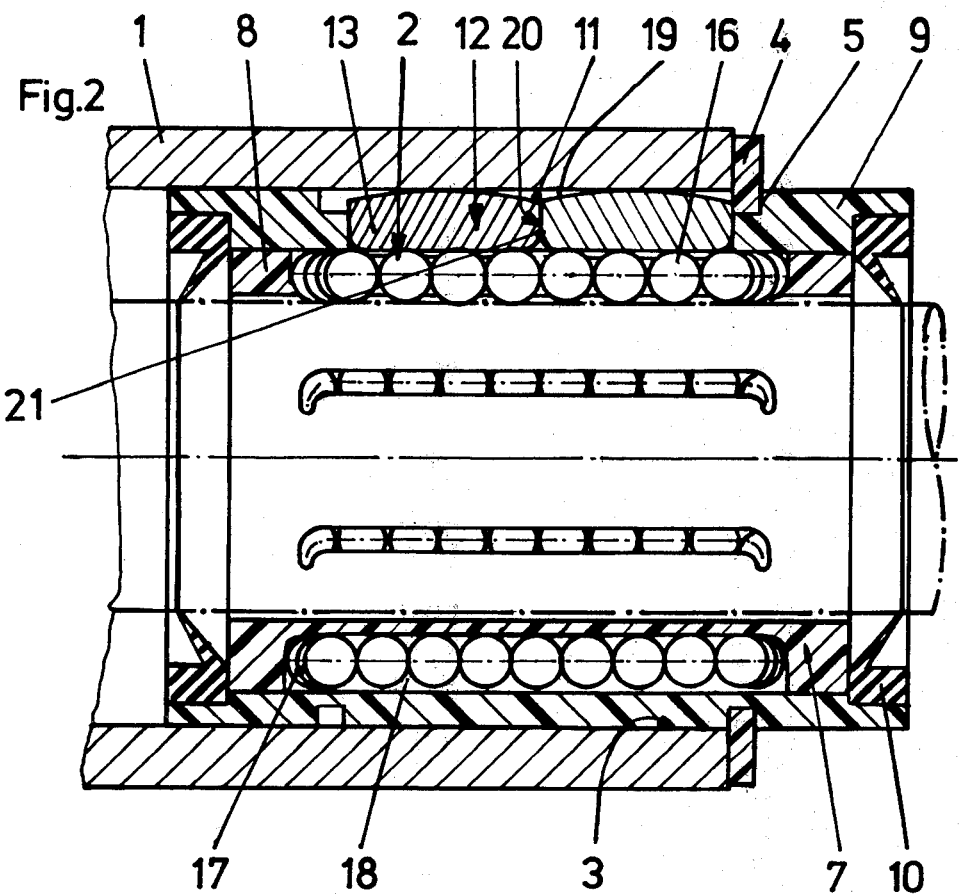
Figure 3:
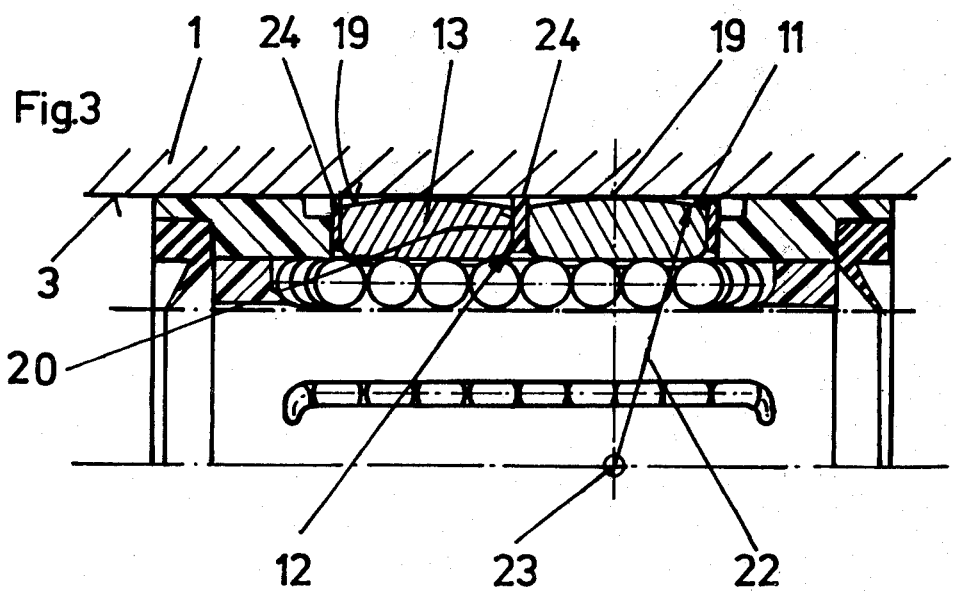
Figure 4:
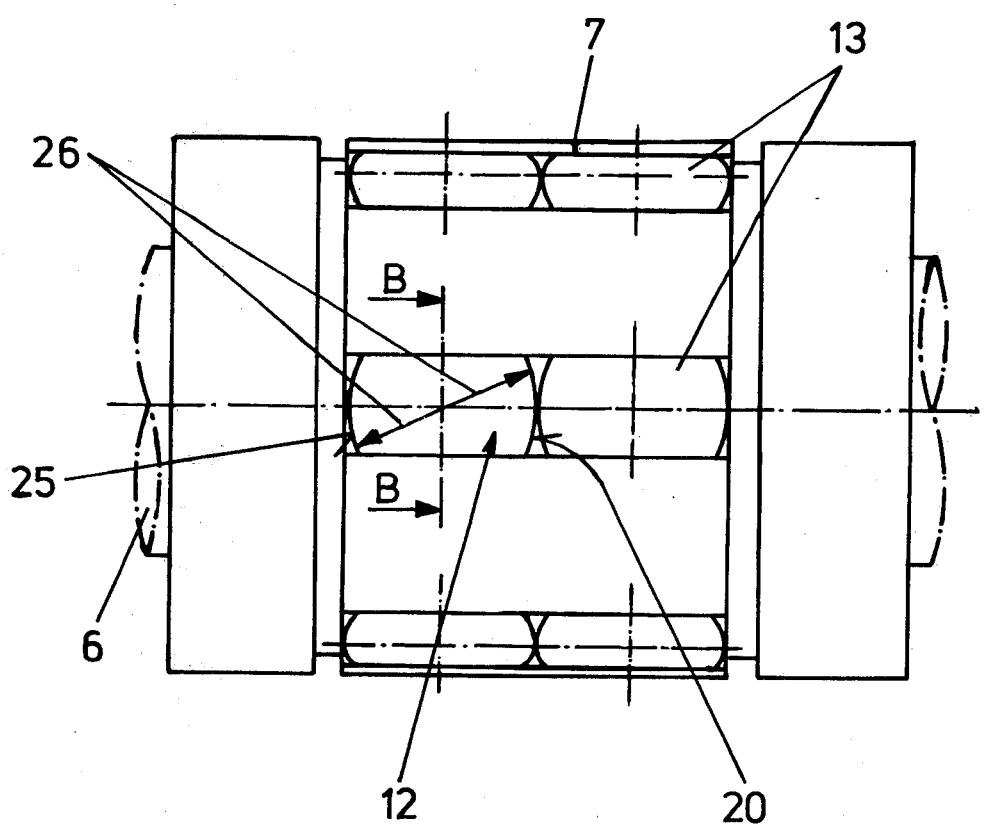
Figure 5:
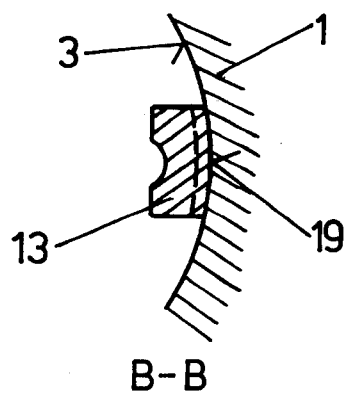
Figure 6:
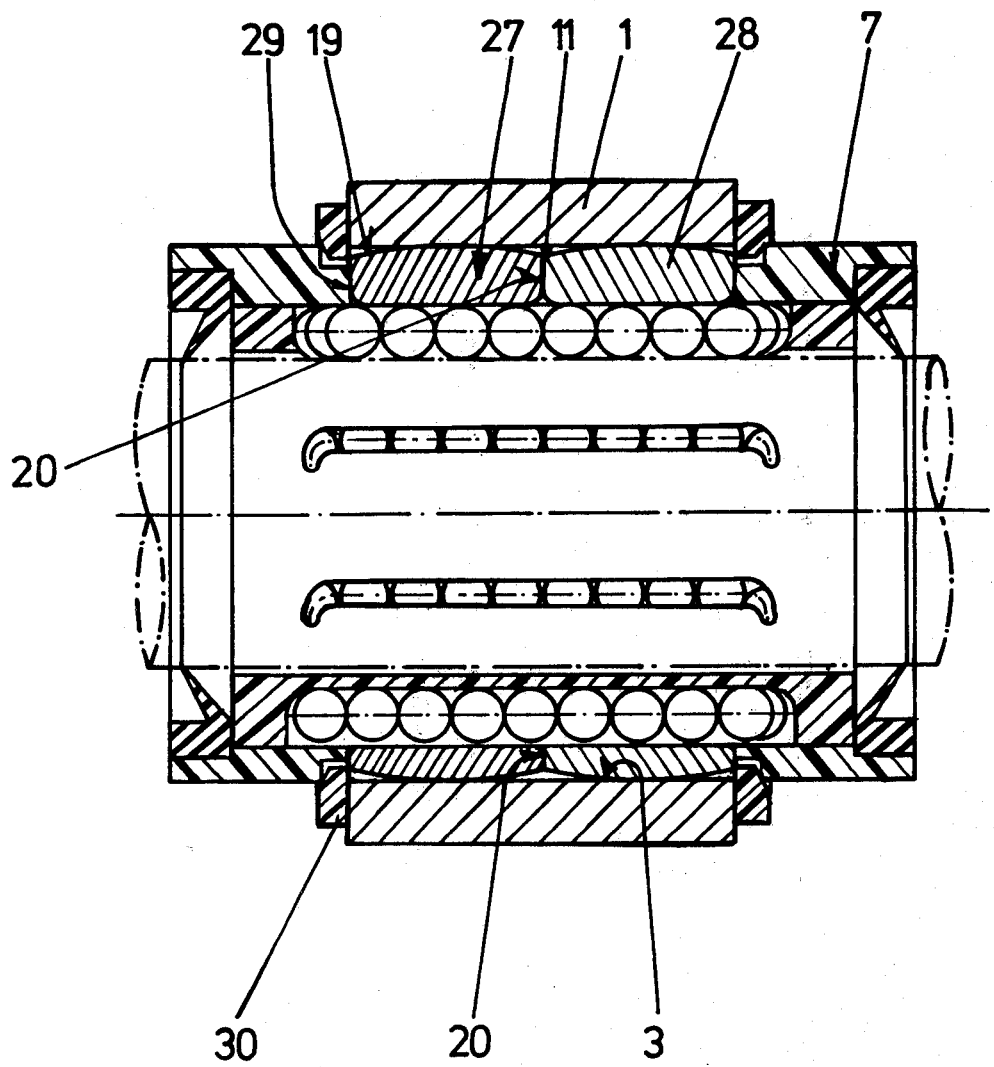
Figure 7:
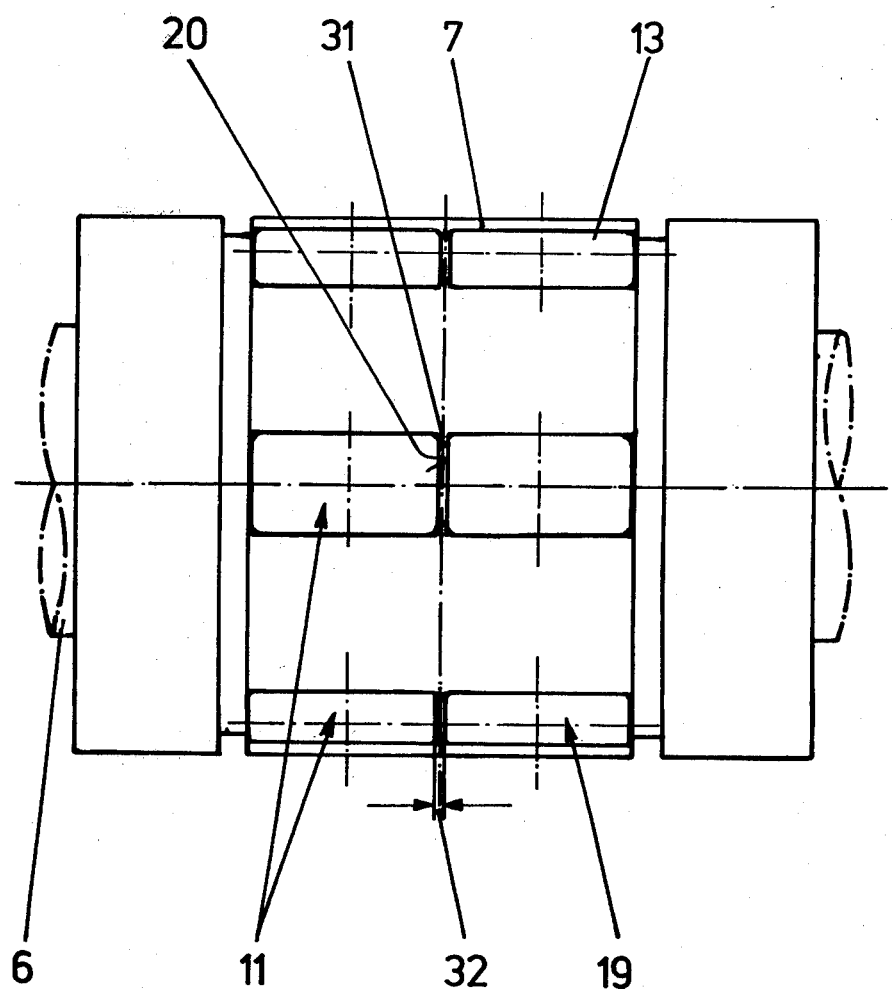

FIG. 1 is a cross section through a rolling bearing for lengthwise movement assembled in a housing with a corresponding shaft, FIG. 2 is a longitudinal section along the line A—A through the rolling bearing with a housing illustrated in FIG. 1, FIG. 3 is a partial longitudinal section through a modified rolling body for lengthwise movement, FIG. 4 is a plan view of a modified rolling bearing, for lengthwise movement, FIG. 5 is a cross section along the line B—B through a partial rail with the respective housing illustrated in FIG. 4, FIG. 6 is a longitudinal section through a further modified rolling bearing for lengthwise movement, and FIG. 7 is a plan view of a modified rolling bearing for lengthwise movement.

In FIGS. 1 and 2, 1 represents a housing and 2 represents a rolling bearing for lengthwise movement fixedly mounted in the cylindrical bore 3 of the housing 1. In FIG. 2 it is clear that the rolling bearing 2 is held fixed axially in the bore 3 of the housing 1 on its right end by a ring element 4 as illustrated in the drawing. This ring element 4 engages a groove 5 in the outer surface of the rolling bearing 2 and is held fast to the housing 1 by screws (not shown).

The rolling bearing 2 surrounds the cylindrical shaft 6. The cage 7 of this rolling bearing 2 is formed to be sleeve shaped and is inserted in the cylindrical bore 3 of the housing 1. In the present case the cage 7 consists of an inner cage sleeve 8 and an outer cage sleeve 9 axially slid thereover, the sleeves being mutually attached to one another. On both side ends of the cage 7, sealing rings 10 are inserted in the cage 7, each sliding on the shaft 6.

The cage 7 is provided with several guide slots 11 distributed about its circumference, which extend radially therethrough and are formed in the cage to extend in the longitudinal direction. Each of the guide slots 11 is radially outwardly covered by a rail 12, which consists of two partial rails 13 arranged adjacent one another in the longitudinal direction and individually supported for tilting movement in the bore 3 of the housing 1.

Load carrying rolling bodies 16 roll between the longitudinally extending groove shaped races 14 of the rail 12, in the present case, and the longitudinally extending races 15 formed by the cylindrical outer surface of the shaft 6, the rolling bodies being assembled in succession in each guide slot 11. The rolling bodies 16 of each guide slot 11 are spherical and are guided in a known manner in endless successive rows over reversing channels 17 and the longitudinally extending return channels 18 of the cage 7 connected thereto.

In the embodiment of the invention illustrated in FIG. 2 each partial rail 13 has an outer surface 19 directly supported in the bore 3 of the housing 1 and sloping from a flat surface toward its longitudinal ends. Each partial rail 13 can thereby tilt somewhat in the longitudinal direction at the position of its thickest wall thickness, which is found approximately at the center of its length, and can automatically adjust itself according to the course of the bending line of the shaft and the corresponding curve of the rolling bodies 16 under the partial rail 13.

The two partial rails 13 inserted adjacent one another in each guide slot 11 have opposed sliding contact flat facing surfaces 20 on their longitudinally facing ends. A material such as plastic, grease lubricant or the like which has minimum friction characteristics is provided between the two facing surfaces 20 of the two partial rails 13. The groove shaped races 14 of the partial rails 13 are enlarged to be somewhat funnel shaped at the two longitudinal ends of the two partial rails 13, so that the in and out running rolling bodies can gradually receive a new orientation in their running direction (without running shock) in these races 14.

A modified rolling bearing for lengthwise movement is illustrated in FIG. 3, which is formed similar to the rolling bearing shown in FIGS. 1 and 2. Thus two longitudinally adjacent partial rails 13, separately tiltably supported in the bore 3 of the housing 1, are inserted again in each longitudinally extending guide slot 11 of the cage 7. Each partial rail 13 is chamfered on its outer surface downwardly toward its longitudinal side ends, whereby the outer surface 19 is directly supported in the bore 3 of housing 1. In this modified rolling bearing, however, the chamfering of each partial rail 13 is formed by a spherical outer surface 19, whose radius 22 is as large as the half diameter of the bore 3 of the housing 1. The centerpoint 23 of the spherical outer surface 19 lies on the axis of the rolling bearing at the central cross-sectional plane of the respective partial rail 13.

A strip 24 comprised of an elastic compressible plastic filled with graphite, molybdenum sulfide or oil, is glued in between the two contacting facing surfaces 20 of the two partial rails 13 of a rail 12. These strips 24 are supported in the bore 3 of the housing 1 as well as on the side walls of the guide slots 11 of the cage 7. Small relative movements of the two facing surfaces 20 are compensated by the strips 24 at least in part due to the elasticity of the strips 24, so that the opposed facing surfaces 20 slip with respect to one another not at all or only to a minimum extent. Moreover, a longitudinally acting elastic prestress is exerted on the two partial rails 13 by the strips 24, so that they are held elastically yielding, but without longitudinal play, in their guide slots 11. Finally also an elastically yielding transition zone is produced between the longitudinally directed races of the two neighboring partial rails 13, in which the rolling bodies 16 can be newly oriented by the transition from the one partial rail 13 to other running directions.

In the above case a further strip 24 is adhered to the facing surfaces longitudinally opposite the facing surfaces 20 of each partial rail 13. These strips 24 are outwardly elastically supported on the longitudinal side end walls of the respective guide slot 11. Each complete rail 12 consisting of two partial rails 13 with respective strips 24, can be prepared as a unit and snapped in the respective slot 11 of the cage with prestress and is thereby inhibited from falling out of the guide slot 11.

FIG. 4 shows a further modified rolling bearing for lengthwise movement, which likewise has rails 12 arranged on the circumference of the cage 7, which each consist of two longitudinally adjacent partial rails 13. The two partial rails 13 in the rail 12 have opposite facing surfaces 20 on their longitudinal ends as in the embodiment illustrated in FIGS. 1, 2 and 3. The facing surfaces 20 as well as the longitudinally opposite surfaces 25 of each partial rail 13 are, however, in the above case formed with convex curvature in the circumferential direction, whereby the profiles of the convex curved facing surfaces 20, 25 have cross-sectional radii 26 (FIG. 4). The overall length of each partial rail 13 is exactly as large as the double radii 26 of the facing surfaces 20, 25. Each partial rail 13 has moreover an outer surface 19 chamfered on its longitudinal side ends and directly supported in the bore of the housing (not shown).

From the illustration of FIG. 5 it is seen that the partial rail 13 has a greater wall thickness at its center than at its end. The shape of its contour on the circumference side closely fits the shape of the cylindrical bore 3 of the respective housing 1, and thus is formed with a circular cross-sectional shape. The opposed contacting facing surfaces 20 of the two partial rails 13 of each rail 12 can roll on one another in the circumferential direction and at the same time slide on one another in the radial direction. As a consequence it is possible for the two partial rails 13 of each rail 12 to somewhat turn and slide or tilt on their outer surfaces 19 in the bore of the housing 1, when the race of the rolling bodies under these partial rails 13 curves in accordance with the bending of the loaded shaft 6.

A modified rolling bearing for longitudinal movement is illustrated in FIG. 6, which has a rail 27, which is comprised of two partial rails 28 arranged adjacent to one another in the longitudinal direction, which are formed ring shaped extending about the circumference of the cage 7, so that each partial rail 28 outwardly covers the respective longitudinal side half of the guide slot 11 arranged on the circumference of the cage. Each partial rail 28 is separately tiltably supported in the bore of the housing 1, so that each can somewhat tilt independently of the other. For this purpose each partial rail 28 has an outer surface 19 chamfered on each longitudinal end and directly supported in the cylindrical bore of the housing 1. The two partial rails 28 of each rail 27 can be made of steel. These partial rails have opposed sliding contacting facing surfaces 20 on their longitudinal ends, which are coated with a friction minimizing lubricant.

Each of the two partial rails 28 has a facing surface 29 which lies opposite its facing surface 20. An elastic spring ring 30 of wedge-shaped cross-section is inserted radially from the outside between the facing surface 28 and the laterally opposite end surface of the respective guide slots 11. This spring ring 30 presses with prestress against the facing surface 29 of the laterally opposite partial rail 28 and thereby fixedly holds these partial rails 28 without play in the guide slot 11. At the same time the spring ring 30 extending radially over the outer surface of the cage 7 ensures against axial sliding of the rolling bearing in the bore 3.

FIG. 7 shows an additional modified rolling bearing for lengthwise movement, which is formed similar to the rolling bearing illustrated in FIGS. 1 and 2. There are again two partial rails 13 assembled in each guide slot 11 on the cage 7 arranged adjacent one another in the longitudinal direction. Each partial rail 13 also has an outer surface 19 chamfered inward from its lateral ends, which is tiltably supported in the bore of a housing (not shown). In the above embodiment, however, the two partial rails 13 of each guide slot 11 are held at a small distance 32 from one another by projections 31 of the cage 7, which extend in between the facing surfaces 20 of these two partial rails 13 which are directed toward one another. These projections 31 are projectingly affixed to the partition of the respective guide slots 11 in the circumferential direction so that in each case two opposed projections 31, opposite one another in the circumferential direction, lie between the facing surfaces 20 of the two partial rails 17. The distance 32 can amount to about 0.4 mm.

The above described embodiments can be modified in structure within the scope of the invention. For example, the cage inserted in the bore of the housing may only have one radially through-going longitudinally extending guide slot, which is covered by a rail, which consists of at least two partial rails arranged adjacent one another in the longitudinal direction and separately tiltably supported in the bore of the housing. In addition, the load carrying rolling bodies positioned in rows behind one another in the guide slots need not be spherical. In addition these can be formed as rolls and have a cylindrical or a curved outer surface corresponding to the shape of the longitudinally extending grooved races of the rail and/or the shaft.

Instead of an outer surface directly supported in the bore of the housing, the partial rails can be separately tiltably supported indirectly in the bore by intermediate elements. These intermediate pieces can, for example, be elastically compressible and thereby permit a tilting movement of the individual rails. The intermediate elements can also have outer surfaces supported in the bore of the housing which are sloped inwardly toward their lateral ends.

What is claimed is:

1. In a rolling bearing for lengthwise movement on a shaft consisting of a cage assembled in the bore of a housing surrounding the shaft, and having at least one longitudinally extending guide slot extending radially therethrough, a rail supported in the bore of the housing outwardly covering the guide slot and load carrying rolling bodies running between longitudinally directed races of the rail and shaft, in which the load carrying rolling bodies are assembled in sequential rows in the guide slots; the improvement wherein the rails are comprised of at least two partial rails individually tiltably supported in the bore of the housing and arranged adjacent to one another in the longitudinal direction.

2. In a rolling bearing according to claim 1, the improvement wherein each partial rail have an outer surface directly supported in the bore of the housing and sloping to its longitudinal ends.

3. In a rolling bearing according to claim 1 or 2, the partial rails of a rail being each inserted in a guide slot on the circumference of the cage.

4. In a rolling bearing according to claim 1 or 2, the improvement wherein the partial rails of a rail are annular and extend around the cage.

5. In a rolling bearing according to claim 1, the improvement wherein at least two of the partial rails of a rail that are arranged adjacent one another have opposite sliding contacting facing surfaces on their laterally opposed ends.

6. In a rolling bearing according to claim 5, the improvement wherein a friction minimizing material are inserted between the contacting facing surfaces of the two partial rails.

7. In a rolling bearing according to claim 5, the improvement wherein at least one of the two contacting facing surfaces of the two partial rails is formed with convex curvature in the circumferential direction.

8. In a rolling bearing according to claim 5, the improvement wherein an elastically compressible material is inserted between the two contacting facing surfaces of the two partial rails.

9. In a rolling bearing according to claim 2, the improvement wherein at least one projection is being provided on the cage projecting inwardly between the opposed surfaces facing toward one another of two adjacently arranged partial rails, holding these two partial rails at a predetermined distance from one another.

* * * * *